United States Patent [19]
O'Donnell et al.

[11] Patent Number: 5,883,630
[45] Date of Patent: Mar. 16, 1999

[54] INCOMPRESSIBILITY CONSTRAINTS FOR INFERRING 3-D MOTION FROM 2-D PROJECTED DISPLACEMENTS IN A THICK-WALLED ELLIPSOID WITH A GEODESIC-BASED TESSELLATION

[75] Inventors: Thomas O'Donnell, New York, N.Y.; Terrance E. Boult, Bethlehem, Pa.; Alok Gupta, East Brunswick, N.J.

[73] Assignee: Siemens Corporation Research, Inc.

[21] Appl. No.: 770,964

[22] Filed: Dec. 20, 1996

[51] Int. Cl.⁶ ....................................................... G06T 15/13
[52] U.S. Cl. ........................... 345/420; 345/423; 364/575
[58] Field of Search ............................ 345/419–20, 423; 364/575

[56] References Cited

U.S. PATENT DOCUMENTS 5,524,396   6/1996   Lalvani .................................... 52/81.1

OTHER PUBLICATIONS

Cohen, et al, "A Motion Conputation and Interpretation Framework for Oceanographic Satellite Images", *Computer Vision*, 1995, pp. 13–18.
Gupta, et al, "3D Model Data Dorrespondence and Nonridge Deformation", *Computer Vision and Pattern Recognition*, 1993, pp. 756–757.
O'Donnell, et al, "Global Models with Parametric Offisets as Applied to Cardiac Motion Recovery", *Computer Vision and Pattern Recognition*, 1996, pp. 293–299.

*Primary Examiner*—Rudolph J. Buchel, Jr.
*Attorney, Agent, or Firm*—Donald B. Paschburg

[57] ABSTRACT

The model of the present invention incorporates incompressibility constraints to infer 3-D motion. Discrete, projected 2-D motion information from two different views of an object are input into the system. A model is realized via the tessellation component, and the material property of incompressibility is imposed on model movement. The output of the system is a continuous 3-D motion model which has interpolated the projected 2-D data.

10 Claims, 4 Drawing Sheets

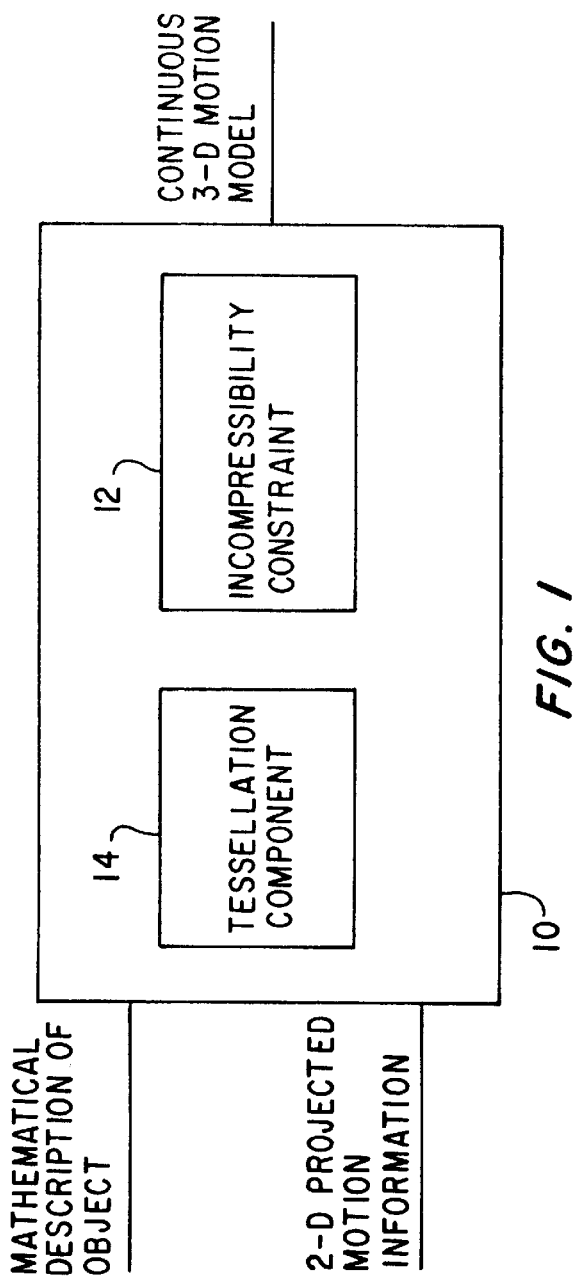
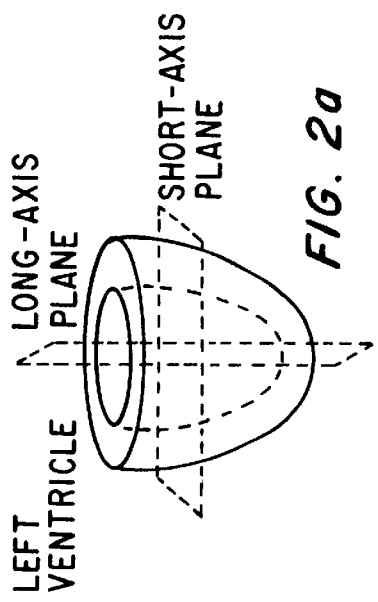

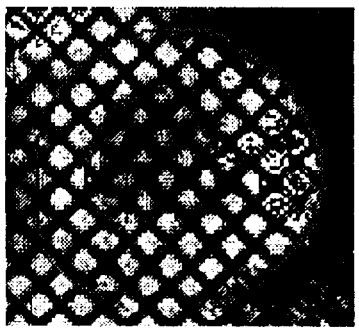
FIG. 2b SHORT AXIS VIEW
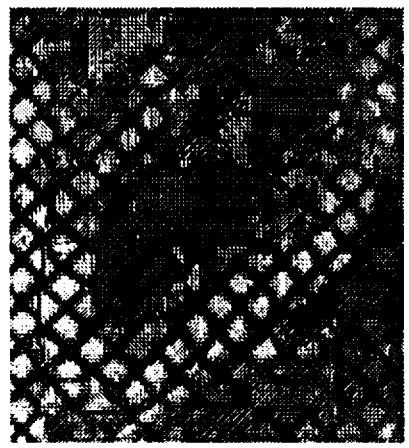
FIG. 2C LONG AXIS VIEW

INCOMPRESSIBILITY CONSTRAINTS FOR INFERRING 3-D MOTION FROM 2-D PROJECTED DISPLACEMENTS IN A THICK-WALLED ELLIPSOID WITH A GEODESIC-BASED TESSELLATION

This patent application is related to U.S. patent application Ser. No. 08/724,698 entitled A Cardiac Motion Recovery System, filed on Sep. 30, 1996, and assigned to the same assignees as the present invention.

BACKGROUND OF THE INVENTION

1. Field of the Invention

The present invention relates to recovering the 3-D motion of a thick-walled ellipsoid given 2-D projected movement in the ellipsoid. The third component of motion is inferred via the material constraint of incompressibility. Due to the inherent instability associated with imposing material constraints, the thick-walled ellipsoid is realized with a unique geodesic-based tessellation.

2. Description of the Prior Art

Park, Metaxas and Young developed a thick ellipsoidal model for recovering 3-D cardiac motion from tagged-MR data in "Deformable Models With Parameter Functions: Application To Heart Wall Modeling", Proceedings of the IEEE CVPR, Seattle, Wash., pages 437–442, 1994. Their model formulation differs from the model formulation of the present invention in that their model assumes a dense motion information acquisition and therefore makes no use of "regularizing" constraints such as incompressibility and does not employ a geodesic tessellation.

O'Donnell, Gupta, and Boult presented a thick superelliptic model, the HVV in "The Hybrid Volumetric Ventriculoid: A Model For MR-SPAMM 3-D Analysis", Proceedings of Computers in Cardiology, IEEE, 1995. Their model fitting was influenced via an inter-nodal stretching penalty as opposed to current incompressibility constraint of the present invention. And was tessellated in a simplistic manner.

Finally, T. Denny and J. Prince in "3D Displacement Field Reconstruction From Planar Tagged Cardiac MR Images", Proceedings of the IEEE Workshop on Biomedical Image Analysis, pages 51–60, 1994, employed a multidimensional stochastic model for measuring cardiac motion from tagged-MR images. They used the Fisher estimation framework to approximate the movement of the Left Ventricle (LV) from sparse displacement measurements with incompressibility constraints.

SUMMARY OF THE INVENTION

The model of the present invention incorporates incompressibility constraints to infer 3-D motion. One obvious domain of application is tagged-MR cardiac analysis where, due to the sparsity of tags, certain regions contain only projected 2-D motion information. It is postulated that the volume of a region remains approximately fixed over time and this is enforced during motion tracking. A novel geodesic-like prismoidal tessellation of the model is presented which provides for more stable fits.

Discrete, projected 2-D motion information from two different views of an object are input into the system. A model is realized via the tessellation component, and the material property of incompressibility is imposed on model movement. The output of the system is a continuous 3-D motion model which has interpolated the projected 2-D data.

BRIEF DESCRIPTION OF THE DRAWINGS

FIG. 1 illustrates a block diagram of the present invention.

FIGS. 2a, 2b and 2c illustrate fitting a single model to data from two orthogonal tag acquisitions in order to recover an estimate of 3-D LV motion.

DETAILED DESCRIPTION OF THE INVENTION

Figure 3A:
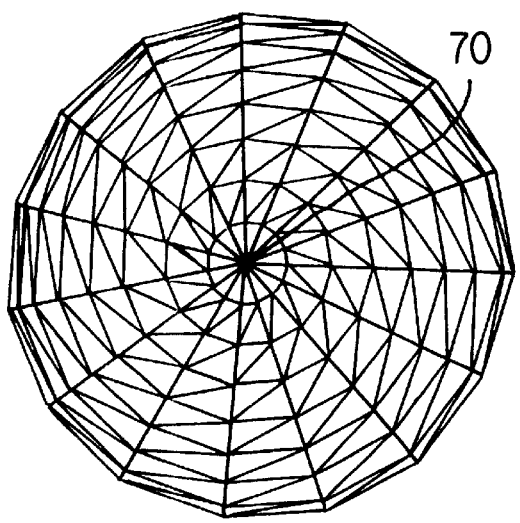
FIGS. 3a and 3b illustrate a comparison of different model tessellations.

FIG. 1 illustrates a block diagram of the present invention which includes model fitter 10. The first element of the present invention is the introduction of incompressibility constraints 12 (for cardiac motion recovery, for example). It is postulated that the volume of a region remains approximately fixed over time and this is enforced during motion tracking. The second element of the present invention involves the tessellation 14 of this model. The model is described by discrete nodes linearly interpolated to form prismoidal elements. To provide high stability, these elements are arranged in a unique configuration based on the geodesic dome developed by R. Buckminster Fuller as described by H. Kenner in Geodesic Math And How To Use It, Berkeley University of California Press, 1976.

Discrete, projected 2-D motion information from two different views of an object are input into model fitter 10. A model is realized via the tessellation component, and the material property of incompressibility is imposed on model movement. The output of the process is a continuous 3-D motion model which has interpolated the projected 2-D data.

The present invention may be directly applied to motion recovery from tagged-MR data. A single tagged-MR acquisition provides projected 2-D displacement information. To recover the motion of the Left Ventricle, for example, two or more multi-slice acquisitions are taken and the correspondence information used to deform a single model (FIG. 2).

Due to the assumed sparsity of data (some regions of the LV are covered and others not), a constraint for model elements to maintain a relative incompressibility during fitting is imposed. It is assumed that incompressibility constraints are more appropriate than minimal inter-nodal stretching constraints as described by O'Donnell, Gupta, and Boult, which attempt to maintain initial element edge lengths for certain types of materials. While the incompressibility constraint itself is not novel (A. Rappoport, A. Sheffer and M. Bercovier, "Volume Preserving Free-Form Solids", Proceedings of ACM Solid Modeling, pages 361–372, 1995) the present invention is one of the first times (T. Denny and J. Prince) it has been suggested to apply it to cardiac motion recovery from image data. Its incorporation follows naturally from the fact that myocardial tissue is mostly water and thus not substantially compressible.

Under constraints such as incompressibility or minimal inter-nodal stretching, the model structure is subject to stress. In order to maintain stability in recovery and lessen the bias inherent in its discrete implementation, it becomes important that the model have sufficient structural support. A unique tessellation of the model of the present invention is introduced which provides this support by basing the nodal distribution on geodesic domes.

The following will describe the present invention's new form of tessellation which links two geodesic domes; one describing the inner wall and the other describing the outer wall. (Note that this formulation may be easily extended to any number of layers of domes between the inner and outer walls.) Since the domes are tessellated by triangles, linking them forms a set of prism shaped elements.

Each model node is guaranteed to have no less than two and no more than six elements associated with it. And, the distribution of elements with nodes is guaranteed to be smooth. The result is a structurally sound model. The tessellation of the present invention differs from other geodesics in that it is designed for a thick-walled ellipsoid model.

Figure 3B:
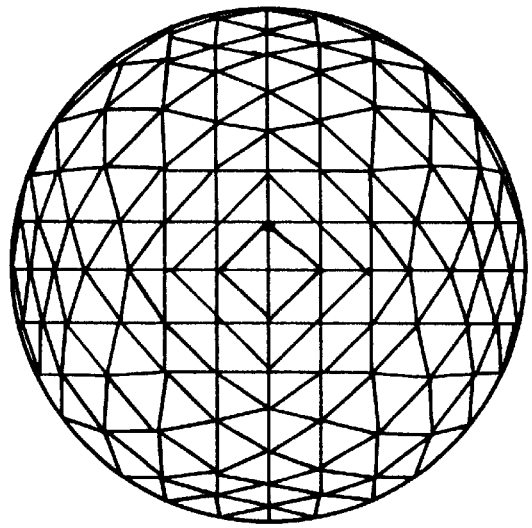

FIGS. 3a and 3b illustrate a comparison of different model tessellations. FIG. 3a illustrates a tessellation based on sealing the end of a tube at a single point. Note that twelve triangular surface elements (underlying prismoidal elements not shown) meet at a single point at the apex as compared to an average of six elsewhere. FIG. 3b illustrates a geodesic based tessellation of the model.

Figure 4:
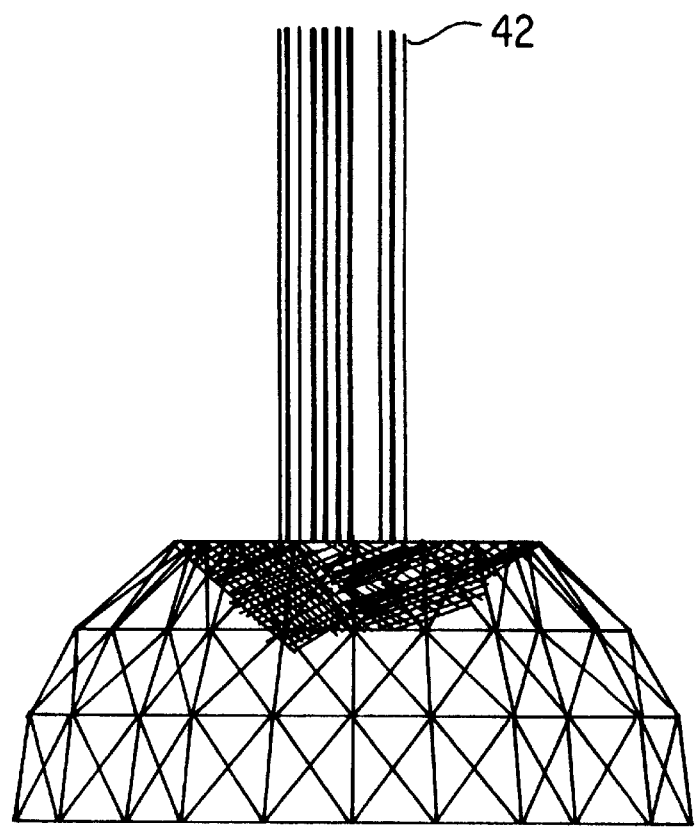
FIG. 4 illustrates a model breaking under high stress during recovery.

The tessellation of the present invention has significant advantages over the so-called sealed tube approach as described by D. Terzopoulos and D. Metaxas, by J. Park, D. Metaxas and A. Young, by T. McInerney and D. Terzopoulos in "A Finite Element Model For 3d Shape Reconstruction And Nonrigid Motion Tracking", *IEEE ICCV*, pages 518–523, 1993, and by O'Donnell, Gupta, and Boult in which several model elements may meet at a single node as illustrated in FIG. 3a. In the sealed tube approach, there is no inherent bound on the number of elements associated with the apex node. This may be problematic if the model undergoes deformations under material constraints (e.g., minimal strain) since stress will be focused on that node. This is illustrated in FIG. 4. At junctures where several elements meet at a single node, the model is at its weakest. Typically, the model tessellated using the sealed tube approach invariably breaks at this junction under conditions of high stress. FIG. 4 illustrates a model breaking under high stress during recovery. The breakage initiates at the apex of the model where twelve elements meet. Note that the top 42 of the figure is clipped.

It is shown below that this situation results in instability and this instability increases with the degree of tessellation. Since a relatively dense tessellation is needed to describe complicated shapes, this limits the effectiveness of the sealed tube approach.

Figures 5A, 5B:
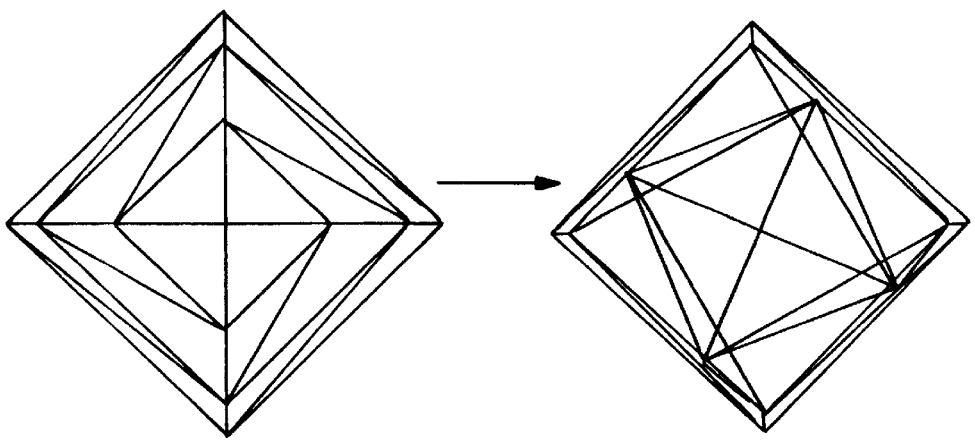
FIGS. 5a and 5b illustrate that under both the minimal stretching and incompressibility constraints, the sealed tube tessellation is biased towards twisting even in the absence of data.

Another structural bias of the sealed tube approach results in an undesired twisting of the model. This is illustrated in FIGS. 5a and 5b. Under both the minimal stretching and incompressibility constraints, the sealed tube tessellation is biased towards twisting even in the absence of data. FIG. 5a illustrates the model prior to the application of the minimal stretching constraint as viewed from apex. FIG. 5b illustrates the model distorting under this constraint. The minimal stretching constraint (Equation 3), for example, attempts to maintain initial element edge lengths. In the body of the mesh these constraints are balanced. At the apex, however, there is a resultant bias which causes a differential rotation. (Note that this effect also occurs when using the constant volume constraint).

The model is tessellated under different schemes for different stages of the recovery process. All of these alternative tessellations are variants of the geodesic approach described above. For fitting to contour data, the surfaces of the model are tessellated with planar triangular elements. For simplifying the calculations each prismoidal element above is broken down into three tetrahedral subelements. These alternating tessellations (prismoidal, planar triangular surface, tetrahedral) are independent of one another.

Constraints on deformation are necessary for recovering, for example, cardiac motion in a clinical setting. A very dense tagged-MR acquisition (five short axis plus five long axis slices) may take up to two hours. This duration in general is thought to be unacceptable (O. Simonetti PhD. Personal Correspondence, 1995). In order to estimate the motion with less data, some form of "regularization" must be imposed on the model.

The minimal stretching constraint as described by O'Donnell, Gupta, and Boult encourages smooth deformations from an initial shape by attempting to maintain internodal distances. It may be used with volumetric as well as planar surface elements. For the present invention, it is employed only on the surface of the model in order to recover a smooth shape.

$$\epsilon_s = k_s \sum_{elements} \sum_{edges} (Length_{current} - Length_{initial})/Length_{initial} \qquad (3)$$

where $k_s$ scales the constraint.

The following will describe incompressibility constraints of the present invention. Like the minimal stretching constraint, the effect is to smooth the model deformations.

Incompressibility forces are especially useful when one or more components of the data motion are unknown, a common characteristic of cardiac tagged MR acquisitions. Incompressibility constraints allow the model to infer the missing components of motion, something that minimal stretching constraints do much less reliably depending on the element configuration.

This constraint seeks to minimize the overall change in element volume.

$$\partial Volume/\partial nodes=0 \qquad (4)$$

Since the above minimization is unconstrained, the element vertices are enforced to deform toward or away from the centroid of the element.

Figure 6:
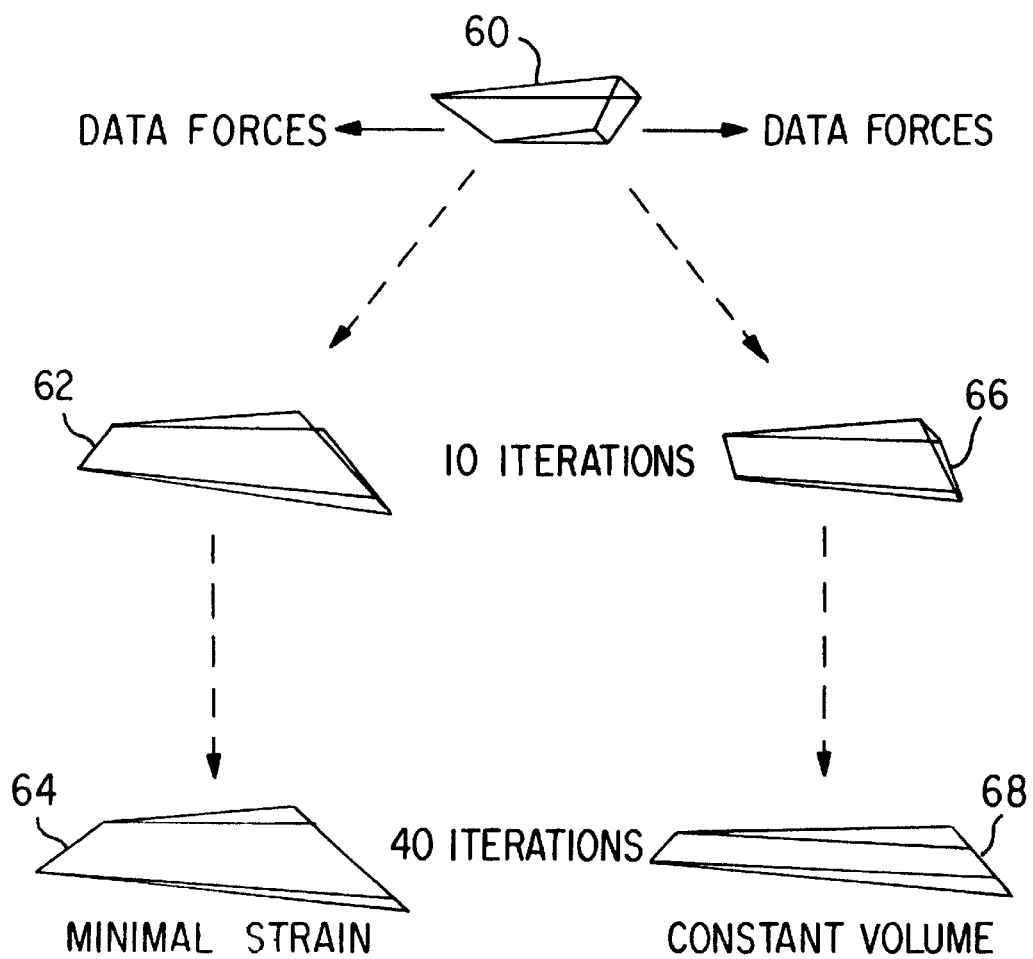
FIG. 6 illustrates a comparison of minimal volumetric stretching and incompressibility constraints as computed by the present invention.

FIG. 6 illustrates a comparison of minimal volumetric stretching and incompressibility constraints as computed by the present invention. Data forces are applied to pull the bottom corners out of the original shape 60. The resulting deformation using minimal stretching constraints is shown for 10 iterations 62 and for 40 iterations 64. Note that the volume increases dramatically. The resulting deformation using incompressibility constraints is shown for 10 iterations 66 and for 40 iterations 68. As the sides bulge, the element flattens.

To discourage local deformations from explaining aspects of the data that could be described by the default model, a deformation penalty is applied $$\int\int\int k_{DisplPenalty} d(u, \vec{v}, \alpha) du \, dv \, d\alpha \qquad (5)$$

where $d(u, \vec{v}, \alpha)$ is the deformation from the (scaled) default model.

Because of this deformation penalty, the final fit may not interpolate the data. If the actual shape of the data deviates from the scalable default shape, a balance will be struck between the two. To cause the model to favor the default model, a high value of $k_{DisplPenalty}$ may be applied. This implies a strong confidence in the expected shape. Similarly, the final fit can be made to virtually interpolate the data via a low deformation penalty. This is appropriate in the case where the default model has little certainty associated with it as described by S. D. Fenster, T. E. Boult and T. O'Donnell in "Physics In A Fantasy World vs. Robust Statistical estimation", T. Boult, M. Hebert, J. Ponce and A. Gross, editors, 3*D Object Representation For Computer Vision*, pages 227–296, Springer-Verlag, 1995.

Incompressibility constraints are employed over volumetric minimal stretching because in areas of the model where one or more components of the motion is unknown, a stretching penalty may not influence the shape of the model in a proper way. Stretching penalties will not necessarily affect this result whereas incompressibility constraints will.

The stability of the tessellation of the present invention was tested by comparing it with the sealed tube tessellation found in O'Donnell, Gupta, and Boult. The outer walls of both models were fit to a densely sampled (121 datapoints) thick hemisphere 20% larger in size. Fitting was done with the minimal volumetric stretching constraint set to an extremely high degree ($k_s$=10), guaranteeing breakage. Table 1 shows the results.

Breakpoint indicates the number of iterations at which the model collapses (see FIG. 4). The higher the breakpoint number, the more stable the model is to deformation. The sealed tube tessellation is described by u and v, the number of nodes in the latitudinal and longitudinal directions respectively.

TABLE 1

A comparison of model stability under the sealed tube and geodesic tessellation schemes.

| Sealed Tube | | Thick Geodesic | |
| --- | --- | --- | --- |
| Tessellation | Breakpoint | Tessellation | Breakpoint |
| u = 4, v = 4 12 elm; 1 node | 750 | 17 surf elms 6 elm; 1 node | 1250 |
| u = 6, v = 8 24 elm; 1 node | 150 | 92 surf elms 6 elm; 1 node | 600 |
| u = 10, v = 15 45 elm; 1 node | 55 | 316 surf elms 6 elm; 1 node | 300 |

From the table, two trends are apparent. First, that the stability goes down as the number of elements goes up. This is due to the fact that a larger mesh requires more propagation time to settle. Second, for reasons already discussed, the stability of the sealed tube tessellation goes down much quicker than the geodesic tessellation.

Note also that the (u=4, v=4) tessellation of the sealed tube is relatively stable compared to the other sealed tube tessellations. This is because the element to node ratio is relatively constant over the entire model. Thus, there is no "weak point".

The model tessellation of the present invention has been shown to provide more stability in fitting than a simplistic sealed cylinder tessellation. Also, it has been shown how incompressibility constraints may be used to infer 3-D motion.

It is not intended that the present invention be limited to the hardware or software arrangement, or operational procedures shown disclosed. This invention includes all of the alterations and variations thereto as encompassed within the scope of the claims as follows.

We claim:

1. Incompressibility constraints for inferring 3-D motion from 2-D projected displacements with a geodesic-based tessellation comprising:

means for associating a tesselation component;

means for associating an incompressibility constraint component; and means for applying a continuous 3-D motion model to 3-D objects to be displayed;

wherein said means for associating a tessellation component describes an overall model by discrete nodes linearly interpolated to form prismoidal elements which are arranged in a unique configuration based on a geodesic dome.

2. Incompressibility constraints for inferring 3-D motion from 2-D projected displacements with a geodesic-based tessellation as claimed in claim 1 wherein said means for associating a tessellation component further comprises;

structural means for providing structural support by basing a nodal distribution on geodesic domes.

3. Incompressibility constraints for inferring 3-D motion from 2-D projected displacements with a geodesic-based tessellation as claimed in claim 1 wherein said means for associating an incompressibility constraint component comprises:

motion means for inferring motion when data is sparsely distributed.

4. Incompressibility constraints for inferring 3-D motion from 2-D projected displacements with a geodesic-based tessellation as claimed in claim 1 wherein said means for associating a tesselation component further comprises:

linking means for linking a first geodesic dome and a second geodesic dome wherein said first geodesic dome describes an inner wall of an object and said second geodesic dome describes an outer wall of said object.

5. Incompressibility constraints for inferring 3-D motion from 2-D projected displacements with a geodesic-based tessellation as claimed in claim 1 wherein said means for associating a tesselation component further comprises;

linking means for linking a plurality of geodesic domes.

6. A method of providing incompressibility constraints for inferring 3-D motion from 2-D projected displacements with a geodesic-based tessellation implemented in a computer system comprising the steps of:

receiving a mathematical description of an object;

receiving 2-D projected motion information;

providing a tesselation component;

providing incompressibility constraints;

outputting a continuous 3-D motion model; and applying said continuous 3-D motion model to 3-D objects to be displayed;

wherein providing a tesselation component comprises the step of:

describing an overall model by discrete nodes linearly interpolated to form prismoidal elements which are arranged in a unique configuration based on a geodesic dome.

7. A method of providing incompressibility constraints for inferring 3-D motion from 2-D projected displacements with a geodesic-based tessellation as claimed in claim 6 wherein providing a tesselation component further comprises the step of:

providing structural support by basing a nodal distribution on geodesic domes.

8. A method of providing incompressibility constraints for inferring 3-D motion from 2-D projected displacements with a geodesic-based tessellation as claimed in claim 6 wherein providing incompressibility constraints comprises the step of:

inferring motion when data is sparsely distributed.

9. A method of providing incompressibility constraints for inferring 3-D motion from 2-D projected displacements with a geodesic-based tessellation as claimed in claim 6 wherein providing a tesselation component further comprises the step of:

linking a first geodesic dome and a second geodesic dome wherein said first geodesic dome describes an inner wall of an object and said second geodesic dome describes an outer wall of said object.

10. A method of providing incompressibility constraints for inferring 3-D motion from 2-D projected displacements with a geodesic-based tessellation as claimed in claim 6 wherein providing a tesselation component further comprises the step of:

linking a plurality of geodesic domes.

\* \* \* \* \*